United States Patent [19]

Hartshorn

[11] Patent Number: 5,226,515
[45] Date of Patent: Jul. 13, 1993

[54] INTERMEDIATE PLATE POSITIONER FOR DUAL PLATE FRICTION CLUTCH

[75] Inventor: Rock L. Hartshorn, Auburn, Ind.

[73] Assignee: Dana Corporation, Toledo, Ohio

[21] Appl. No.: 928,563

[22] Filed: Aug. 11, 1992

[51] Int. Cl.$^5$ ............................................. F16D 13/75
[52] U.S. Cl. .............................. 192/70.25; 192/111 A
[58] Field of Search ............ 192/70.25, 70.19, 111 A; 188/71.5

[56] References Cited

U.S. PATENT DOCUMENTS

| | | | |
|---|---|---|---|
| 3,797,622 | 3/1974 | Worner et al. | 192/111 A |
| 4,466,524 | 8/1984 | Lane | 192/111 A X |
| 4,601,373 | 7/1986 | Despres et al. | 192/70.18 |
| 4,640,400 | 2/1987 | Nakane et al. | 192/70.25 |
| 4,684,002 | 8/1987 | Takeuchi | 192/70.25 |
| 4,742,901 | 5/1988 | Takeuchi et al. | 192/70.25 |
| 4,941,557 | 7/1990 | Flowtow et al. | 192/70.25 |
| 4,958,714 | 9/1990 | Cooke et al. | 192/70.25 X |
| 5,054,597 | 8/1991 | Tarlton, Sr. | 192/70.25 |
| 5,080,212 | 1/1992 | Flowtow et al. | 192/70.25 |
| 5,090,537 | 2/1992 | Fukuda | 192/70.25 X |

Primary Examiner—Rodney H. Bonck
Assistant Examiner—Andrea Pitts
Attorney, Agent, or Firm—Dykema Gossett

[57] ABSTRACT

A frictional two disc clutch includes a self-adjusting intermediate plate, telescoping positioners, and a removable set clip. The telescoping positioners and removable set clip are used to compensate for manufacturing variations so that the intermediate plate is properly positioned with respect to the discs and pressure plate. Each positioner includes a hollow cylindrical sleeve having a pin telescopingly disposed within it through an interference fit which has a high frictional resistance to movement. The positioner is collapsed to the proper length through the use of a removable set clip received on the cover. The thickness of the portion of the set clip positioned between the pin of the positioner and the cover is equal to one-half the initial travel of the pressure plate and the travel of the intermediate plate. With the clip in place, the desired length of the positioner is established through the action of bolting the cover to the flywheel. The pin moves relative to the sleeve to a position such that when the clutch is disengaged, the intermediate plate will move to a centered position between the pressure plate and flywheel. The clutch is then disengaged and the set clip removed.

13 Claims, 1 Drawing Sheet

INTERMEDIATE PLATE POSITIONER FOR DUAL PLATE FRICTION CLUTCH

BACKGROUND OF THE INVENTION

The present invention relates to a dual plate friction clutch having an adjustable positioner and removable set clip for properly positioning an intermediate plate relative to a pair of driven discs.

Dual plate friction clutches having a pair of interleaved driven discs with an intermediate plate disposed between the driven discs are well-known in the prior art. Typically, a flywheel is attached to an input member with a clutch cover attached to the flywheel for rotation therewith. A pressure plate is disposed between the flywheel and the cover, and is connected to the cover for rotation therewith. The pressure plate is axially movable with respect to the cover between engaged and disengaged positions. The driven discs and intermediate plate are disposed between the flywheel and the pressure plate. The intermediate plate is connected to the cover for rotation therewith but may move axially relative to the cover. Rotational velocity is selectively transmitted from the flywheel to drive the driven discs via axial movement of the pressure plate and intermediate plate between respective disengaged and engaged positions.

The intermediate plate must be accurately positioned in order to provide proper clearance between the discs and the intermediate plate when the clutch is disengaged. Otherwise, there will be undesirable interaction between the intermediate plate and the driven discs. As a result, it is desirable to initially position the intermediate plate half way between the pressure plate and the flywheel in the disengaged position. Various arrangements have been used to properly position the intermediate plate.

In one system, a plurality of positioners are slidably mounted within apertures formed about the periphery of the intermediate plate. There is an interference fit between each positioner and the aperture resulting in a frictional resistance to motion. When the clutch is engaged, a forward end of each positioner abuts the rearward surface of the flywheel. When the clutch is disengaged, a rearward end of each positioner abuts the forward surface of the cover. As the facings of the intermediate plate and forward disc wear with use, the intermediate plate will be moved forwardly along the positioners towards the flywheel. This movement occurs because a force exerted on the intermediate plate with respect to the positioners when the clutch is engaged is greater than the frictional resistance between the positioners and the apertures of the intermediate plate.

In practice, proper positioning has been difficult to obtain with such systems. The clutch parts have manufacturing tolerances. As a result, when assembled, a positioner of a fixed axial length may resulted in undesirable interferences, particularly when the positioner is of insufficient length, resulting in improper positioning of the intermediate plate.

SUMMARY OF THE INVENTION

In a disclosed embodiment of the present invention, a dual plate friction clutch with a pair of interleaved driven discs includes a self-adjusting intermediate plate disposed between the driven discs, telescoping positioners, and a removable set clip. The telescoping positioners and removable set clip are used to compensate for manufacturing variations so that the intermediate plate is properly positioned with respect to the driven discs and pressure plate.

Each positioner includes a hollow cylindrical sleeve having a pin telescopingly disposed therein. The outer peripheral circumference of the pin is nearly identical to the inner peripheral circumference of the sleeve. Thus, there is a very tight interference fit and a correspondingly high frictional resistance to movement between the sleeve and pin. More force is required to move the pin with respect to the sleeve than is required to move a positioner with respect to the aperture formed within the intermediate plate. The pin extends outwardly from the sleeve, and the assembly is designed so that the pin may be forced into the sleeve when sufficient force is applied.

A removable set clip is used to assist in setting the appropriate axial length of the positioner. The set clip is received on the outer periphery of the cover before the clutch is assembled. The thickness of a portion of the set clip corresponds to the desired travel of the intermediate plate between its engaged and disengaged positions, or one-half the initial travel of the pressure plate between its engaged and disengaged positions.

Once the set clip is received on the cover, the desired length of the positioner is established through the action of bolting the cover to the flywheel. The forward end of the positioner abuts the rearward surface of the flywheel. Simultaneously, the rearward end of the positioner abuts the set clip. Sufficient force is applied by the bolting action to overcome the frictional resistance between the sleeve and the pin with the pin moving from a first position to further within the sleeve until there is full frictional engagement between the pressure plate, intermediate plate, discs, and flywheel.

At this point the clutch is disengaged and the clip removed. The clutch then may be engaged and disengaged normally. When disengaged, the intermediate plate is urged from its engaged position to its disengaged position. The rearward end of the pin then abuts the cover. When engaged, the forward end of the sleeve abuts the flywheel.

The objects of the present invention can be best understood from the following specifications and drawings of which the following is a brief description.

DETAILED DESCRIPTION OF THE PREFERRED EMBODIMENT

Figure 1:
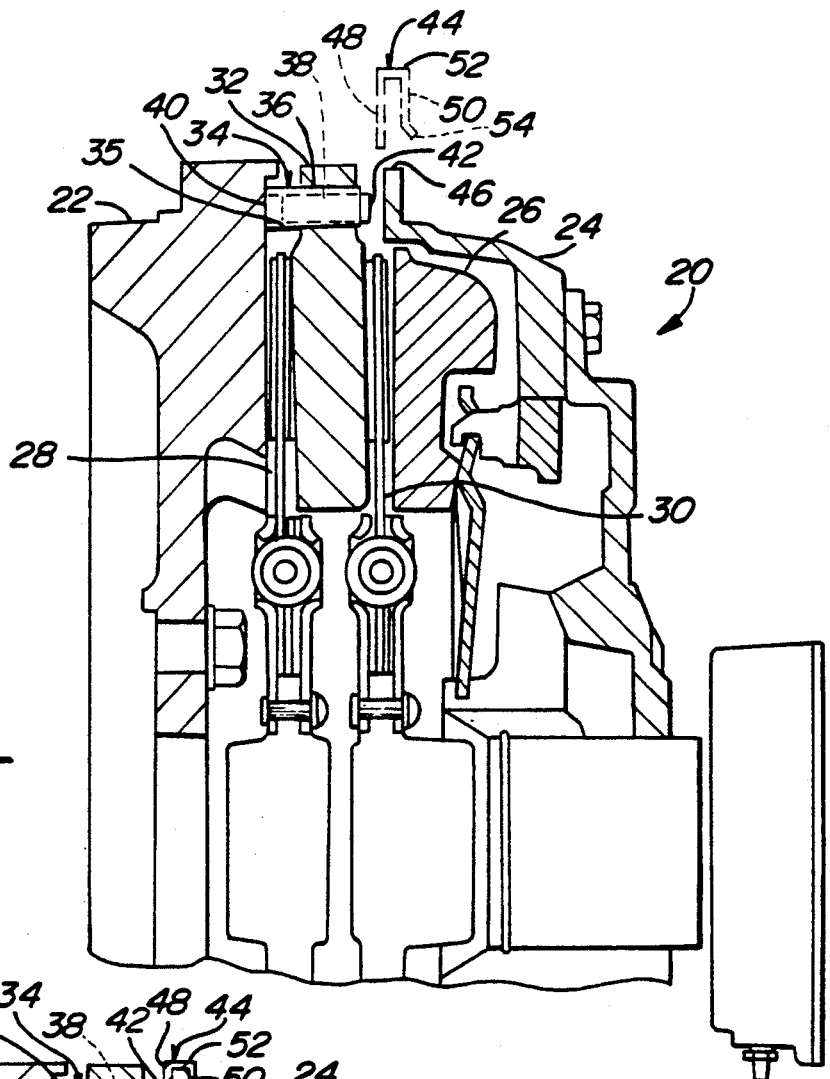
FIG. 1 is a partial elevational cross-sectional view of a portion of a clutch incorporating the present invention.

FIG. 1 illustrates a frictional clutch assembly 20 for selectively connecting an input member to an output member. It includes a flywheel 22 for attachment to the input member and a clutch cover 24 attached to flywheel 22 for rotation therewith. A pressure plate 26 is disposed between flywheel 22 and cover 24. Pressure plate 26 is connected to cover 24 for rotation therewith, but it is axially movable relative to cover 24 between engaged and disengaged positions. A pair of driven discs 28 and 30 are disposed between flywheel 22 and pressure plate 26. An intermediate plate 32 is positioned between discs 28 and 30. Intermediate plate 32 is connected to cover 24 for rotation therewith, but is axially movable relative to cover 24 between engaged and disengaged positions. A known structure selectively causes pressure plate 26 and intermediate plate 32 to move towards flywheel 22 and contact driven discs 28 and 30, engaging the clutch.

Intermediate plate 32 must be accurately positioned in order to provide proper clearance between discs 28 and 30, intermediate plate 32 and pressure plate 26 when the clutch is disengaged. Otherwise, there may be undesirable frictional engagement between the intermediate plate and the driven discs. To position intermediate plate 32, a plurality of positioners 34 are slidably mounted within apertures 35 formed about the periphery of intermediate plate 32. Typically, four such positioners are used. The outer peripheral circumference of positioner 34 is slightly smaller than the inner peripheral circumference of aperture 35. Thus, there is an interference fit between the two and a frictional resistance to movement.

Positioner 34 includes a hollow cylindrical sleeve 36 having a pin 38 telescopingly disposed therein. The outer peripheral circumference of pin 38 is nearly identical to the inner peripheral circumference of the sleeve 36. As a result, sleeve 36 and pin 38 have a high frictional resistance to motion. A forward end 40 of sleeve 36 selectively engages flywheel 22 and rearward end 42 of pin 38 selectively engages a forward surface of cover 24.

FIG. 1 illustrates the normal engagement of clutch assembly 20. Forward ends 40 of sleeves 36 abut the rearward surface of flywheel 22. When the clutch is disengaged, rearward ends 42 of pins 38 abut the forward surface of cover 24. As the facings of intermediate plate 32 and disc 28 wear, intermediate plate 32 is moved forwardly along sleeve 36 toward flywheel 22. The force exerted on intermediate plate 32 with respect to positioners 34 when the clutch is engaged is greater than the frictional resistance between the positioners and apertures 35.

Figure 2:
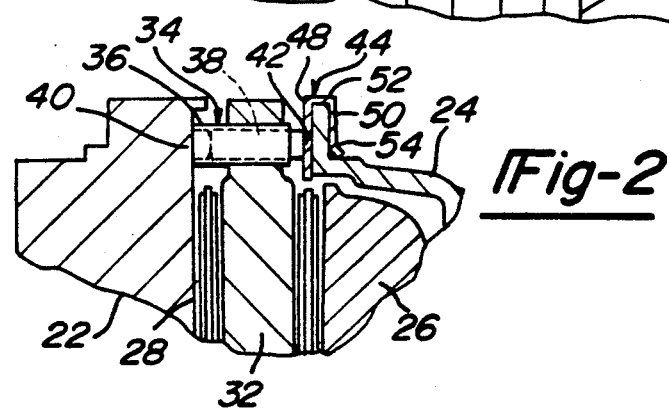
FIG. 2 is a cross-sectional view through a portion of a clutch incorporating the present invention.

The use of set clip 44 is illustrated in FIG. 2. Legs 48 and 50 are separated by a web portion 52. Leg 50 includes a hooked end portion 54 to aid in clip removal. Set clip 44 is received on cover 24 before the clutch is assembled. The desired length of positioner 34 is established through the action of bolting cover 24 to flywheel 22. Forward end 40 of positioner 34 abuts flywheel 22 and rearward end 42 abuts leg 48. The normal engagement of clutch assembly 20 is insufficient to overcome the frictional resistance to movement between pin 38 and sleeve 36. Additional force is required to compress pin 38 into sleeve 36 from an outer first position to the position shown. This additional force is supplied by the bolting action. The second position is reached once intermediate plate 32 is accurately positioned in frictional engagement with discs 28 and 30 in conjunction with pressure plate 26 and flywheel 22. At this point the clutch is disengaged and set clips 44 removed. Clutch assembly 20 then may be engaged and disengaged normally.

Preferably, the thickness of leg 48 corresponds to the desired travel of intermediate plate 32 between its engaged and disengaged positions. More preferably, the desired initial travel of intermediate plate 32 is one-half the initial travel of pressure plate 26 between its engaged and disengaged positions. The ability to adjust positioner 34 despite manufacturing variations in the components assures the accurate positioning of intermediate plate 32 so that undesirable interactions with discs 26 and 28 are avoided.

Figure 3:
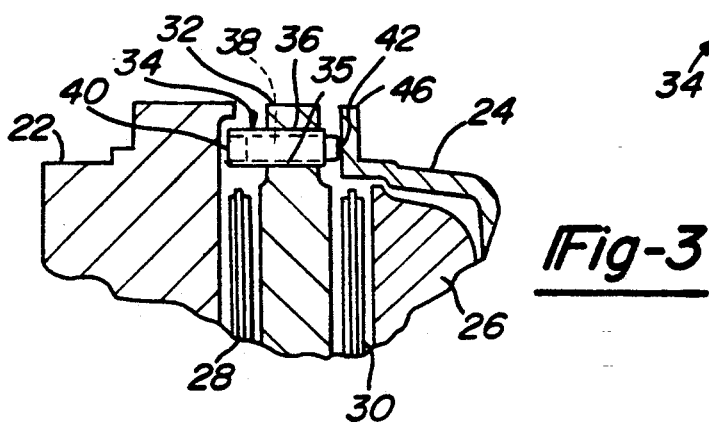
FIG. 3 is a cross-sectional view through a portion of a clutch incorporating the present invention.

The properly positioned intermediate plate is urged from its engaged position to the disengaged position shown in FIG. 3 with rearward end 42 of positioner 34 abutting the forward surface of cover 24. Insufficient force is applied when intermediate plate 32 moves to its disengaged position to overcome the frictional resistance between positioners 34 and corresponding apertures 35. The abutment of rearward end 42 and cover 24 places intermediate plate 32 equidistant from flywheel 22 and pressure plate 26. As the facings of intermediate plate 32 and discs 28 and 30 wear, the intermediate plate will move forwardly along positioner 34 as discussed above. Enough clearance will exist, however, to prevent interference between intermediate plate 32 and disc 28.

Typically, if a pressure plate 26 has a 0.060" minimum departure between its engaged and disengaged positions, a set clip 44 with a first leg 48 0.030" thick would be used to collapse each positioner 34. Once positioner 34 is moved to the correct length and clip 44 released, there will be a 0.030" departure between the forward surface of intermediate plate 32 and the rearward surface of flywheel 22. Simultaneously, there will be a minimum 0.030" inch departure between the rearward surface of the intermediate plate and the forward surface of pressure plate 26.

Figure 4:
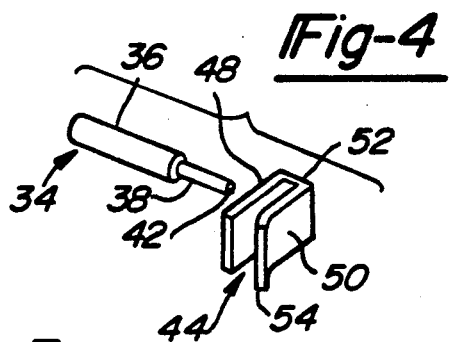
FIG. 4 is a perspective view of a positioner and removable set clip according to the present invention.

A perspective view of both positioner 34 and set clip 44 are illustrated in FIG. 4. Pin 38 is shown in its first expanded position relative to sleeve 36. The width of clip 44 is such that rearward end 42 has no difficulty abutting forward surface of leg 48 when the clip is properly installed.

A preferred embodiment of the present invention has been disclosed. A worker of ordinary skill in the art would realize, however, that certain modifications would come within the teaching of this invention. Thus, the following claims should be studied in order to determine the true scope and content of the invention.

I claim:

1. A friction clutch for selectively connecting an input member to an output member comprising:
   a flywheel;
   a clutch cover attached to said flywheel for rotation therewith;
   a pressure plate disposed between said flywheel and said cover, said pressure plate being connected to said cover for rotation therewith and being axially movable between engaged and disengaged positions relative to said cover;
   a pair of discs and an intermediate plate disposed between said flywheel and said pressure plate, said intermediate plate placed between said discs for selective frictional engagement to transmit drive, said intermediate plate being connected to said cover for rotation therewith and being axially movable between engaged and disengaged positions relative to said cover;
   said intermediate plate having at least one aperture, at least one collapsible positioner mounted in said aperture, said positioner including a hollow sleeve and a pin frictionally disposed in said sleeve, a first end of said pin being received in said sleeve, with a frictional resistance to motion, and a second end of said pin extending outwardly of said sleeve, said pin being selectively driven axially into said sleeve when a force is applied to said positioner greater than said frictional resistance, a forward end of said positioner defined on one of said sleeve and said pin selectively abutting said flywheel when said clutch is engaged and a rearward end of said positioner, defined on the other of said sleeve and said pin, selectively engaging said cover when said clutch is disengaged.

2. The clutch as recited in claim 1, further including removable adjustment means, said adjustment means being used to selectively position said pin relative to said sleeve through the application of force to said adjustment means.

3. The clutch as recited in claim 2, wherein said adjustment means comprises a removable set clip, said set clip being received on said cover and having a first and second leg separated by a web section, said first leg being disposed between said rearward end of said positioner and a forward surface of said cover.

4. The clutch as recited in claim 3, wherein the thickness of said first leg is equal to one-half of a desired initial travel of said pressure plate and said intermediate plate between said engaged and disengaged positions.

5. The clutch as recited in claim 4, wherein said second leg includes a hooked end portion, said portion extending laterally outwardly away from said second leg at an angle, said portion being used to aid in removal of said set clip.

6. A friction clutch for selectively connecting an input member to an output member comprising:
a flywheel;
a clutch cover attached to said flywheel for rotation therewith;
a pressure plate disposed between said flywheel and said cover, said pressure plate being connected to said cover for rotation therewith and being axially movable relative to said cover between engaged and disengaged positions;
a pair of discs and an intermediate plate disposed between said flywheel and said pressure plate, said intermediate plate disposed between said discs for selective frictional engagement to transmit drive, said intermediate plate being connected to said cover for rotation therewith and being axially movable relative to said cover between engaged and disengaged positions;
said intermediate plate having at least one aperture, at least one positioner received in said aperture, an outer peripheral circumference of said positioner being slightly smaller than an inner peripheral circumference of said aperture, said positioner including a hollow cylindrical sleeve having a pin telescopingly disposed therein, an outer peripheral circumference of said pin being nearly identical to an inner peripheral circumference of said sleeve such that said sleeve and said pin have a frictional resistance to motion, a forward end of said positioner selectively engaging said flywheel in an engaged position and a rearward end of said positioner selectively engaging said cover in a disengaged position; and
a removable set clip, said set clip being selectively received on said cover, wherein when said set clip is received on said cover, a force is applied to said positioner greater than said frictional resistance, and said pin is driven axially into said sleeve.

7. The clutch as recited in claim 6, wherein said set clip has a first and second leg separated by a web section, a forward surface of said first leg selectively engaging said rearward end of said positioner and a rearward surface of said first leg being in contact with a forward surface of said cover.

8. The clutch as recited in claim 7, wherein said second leg includes a hooked end portion to aid in set clip removal.

9. The clutch as recited in claim 6, wherein said forward end of said positioner consists of an end of said sleeve and said rearward end of said positioner consists of an end of said pin.

10. The clutch as recited in claim 9, wherein said positioner is frictionally retained in said opening of said intermediate plate through an interference fit, a first force required to move said positioner relative to said interference plate being less than a second force required to move said pin relative to said sleeve.

11. A method of initially setting the axial displacement of a positioner disposed between a flywheel and a cover of a clutch, comprising the steps of:
(A) slidably disposing an intermediate plate between two discs and on at least one positioner, said positioner including a hollow sleeve having a pin telescopingly disposed therein in an interference fit, with a frictional resistance to motion, and with a first end of said pin received in said sleeve and a second end of said pin extending outwardly of said sleeve;
(B) positioning a removable set clip on said cover for engagement with one of said pin and said sleeve;
(C) applying a force to said positioner through said set clip to overcome said frictional resistance and collapsing said positioner to a desired axial length such that said first end of said pin moves from a first position to a second position further into said sleeve;
(D) disengaging said clutch; and
(E) removing said set clip.

12. The method as recited in claim 11, wherein step (C) comprises a substep of applying a force to said cover, forcing said set clip against free the second end of said pin and a free end of said sleeve against said flywheel, thus bringing said discs and said intermediate plate into frictional engagement.

13. The method as recited in claim 12, wherein a first force required to move said positioner relative to said intermediate plate is less than a second force required to move said pin relative to said sleeve.

* * * * *

UNITED STATES PATENT AND TRADEMARK OFFICE
CERTIFICATE OF CORRECTION

PATENT NO.   :   5,226,515
DATED        :   July 13, 1993
INVENTOR(S)  :   Rock L. Hartshorn It is certified that error appears in the above-identified patent and that said Letters Patent is hereby corrected as shown below:

Column 6, line 52, please delete "free".

Signed and Sealed this

Twenty-sixth Day of April, 1994

Attest:

BRUCE LEHMAN

Attesting Officer          Commissioner of Patents and Trademarks